UNITED STATES PATENT OFFICE.

JOSEPH F. CULLEN, OF MIDVALE, AND MARVIN J. UDY, OF SALT LAKE CITY, UTAH, ASSIGNORS TO UNITED STATES SMELTING, REFINING & MINING COMPANY, A CORPORATION OF MAINE.

PROCESS OF EXTRACTING BISMUTH.

1,360,271.  Specification of Letters Patent.  Patented Nov. 30, 1920.

Application filed March 19, 1918. Serial No. 223,410.

*To all whom it may concern:*

Be it known that we, JOSEPH F. CULLEN and MARVIN J. UDY, citizens of the United States, residing at Midvale and Salt Lake City, respectively, in the county of Salt Lake and State of Utah, have invented certain new and useful Improvements in Processes of Extracting Bismuth; and we do hereby declare the following to be a full, clear, and exact description of the invention, such as will enable others skilled in the art to which it appertains to make and use the same.

The invention relates to the extraction of bismuth from ores or other materials containing the metal, and its object is to provide a novel and improved method by which this metal may be economically recovered.

Figure 1:
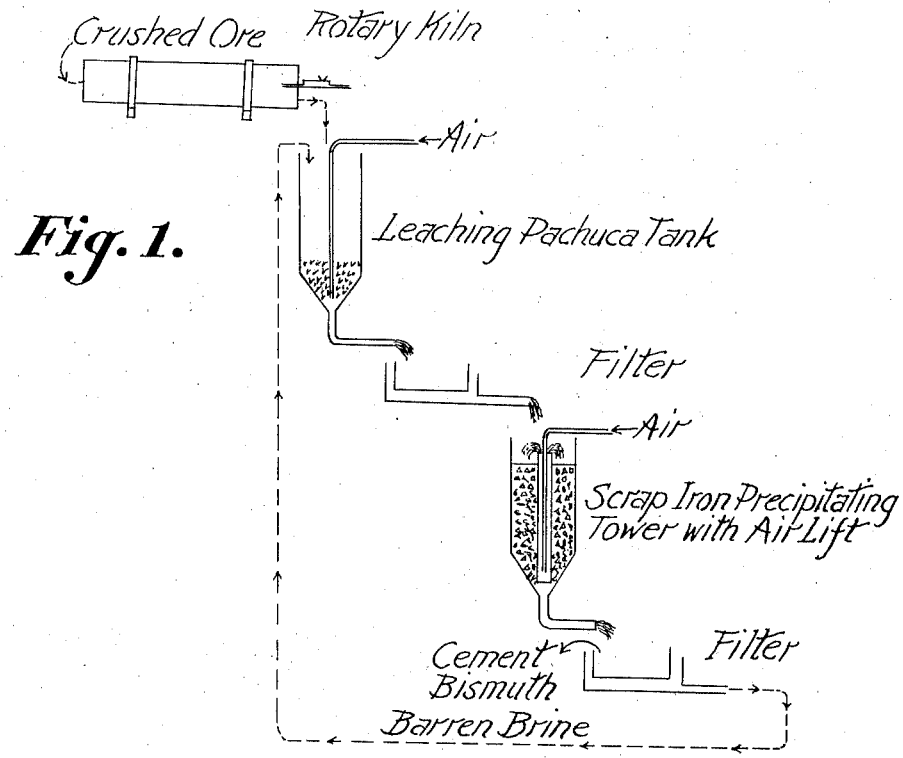
Figure 2:
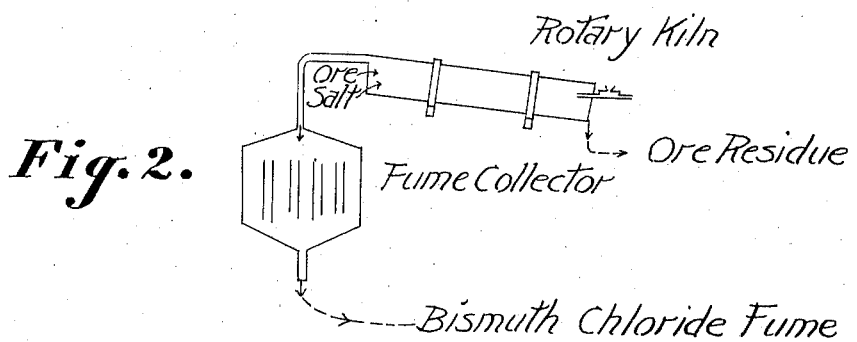

A diagrammatic flow sheet illustrative of the method is indicated in Figures 1 and 2 of the drawing.

The process may be most simply and economically applied to ores containing the bismuth in oxidized form, such for instance as basic bismuth carbonate. When an ore to be treated, however, contains bismuth in the form of native metal or sulfid mineral, it may be crushed and roasted (as for instance in a rotary kiln fired with powdered coal) in order to convert the bismuth to an oxidized state. The treatment of the ore or material in which all or nearly all of the bismuth content is in an oxidized state, is preferably as follows. The ore is crushed dry to 20 to 40 mesh size and leached with brine containing about twenty parts by weight common salt, and also enough sulfuric acid to neutralize the basic constituents of the ore and give the leach a faintly acid reaction. Bismuth sulfate is thus formed which is dissolved in the acid brine. This leaching is preferably done in a wooden Pachuca tank, wherein the crushed ore and brine are agitated by means of air. When the solution of the bismuth is complete, or nearly so, the brine pulp is discharged from the leaching tank into a filter press and the brine containing the dissolved bismuth is separated from the ore residue. The residue is washed with fresh brine and the washed residue sent to the dump, or if it contains metallic value, to a smelter. The filtrate and washing are allowed to mingle, and the bismuth is precipitated from the solution as a metallic sponge or cement by bringing the solution into contact with scrap iron in any convenient manner, as by agitating the iron and solution in a revolving wooden cylinder, or by causing the solution to flow over the scrap iron placed in long shallow launders or packed in towers. The bismuth cement is separated from the solution by filtering, and may then be dried and melted in a furnace for casting into molds. The filtrate, now barren brine, may be used for leaching new ore.

Instead of precipitating the bismuth from the brine solution by contact with iron, it may be precipitated as hydrate or as basic chlorid by the addition of milk of lime to the solution. This precipitate may then be separated by filtering, and reduced to metallic bismuth by fusion with carbon and a suitable flux.

By a modified treatment of the ore or material prior to the leaching with the acid brine indicated in Fig. 2, the bismuth may be extracted regardless of the character of the bismuth minerals contained therein. This treatment consists in mixing the crushed ore with salt and then roasting the mixture (as for instance in a rotary kiln fired with powdered coal) at a high temperature, say from 700° to 1000° C., which however need not be high enough to cause sintering of the ore. The bismuth is volatilized from the ore as bismuth chlorid, and may be collected from the furnace gases in any suitable manner, as by bag filters or by an electrostatic dust collector. The quantity of salt needed for the substantially complete volatilization of the bismuth will vary with the composition of the ores, and it is preferable to use a liberal excess of salt over the theoretical requirement in order to insure complete volatilization. The bismuth chlorid fume may be treated by leaching with acid brine, and the bismuth recovered in the manner already described in connection with the treatment of ores.

The chemical conditions and effects involved in practising the methods are substantially as follows. When the naturally oxidized ores, or ores which have been oxidized by roasting, are leached with a brine containing sulfuric acid, the carbonate and oxid of bismuth are converted into bismuth sulfate which is readily soluble in the acid brine. Thus the conversion of the basic bismuth carbonate mineral to bismuth sulfate is represented by the following formula:

$$3(BiO)_2CO_3, 2Bi(OH)_3, 3H_2O + 12H_2SO_4 = 4Bi_2(SO_4)_3 + 18H_2O + 3CO_2.$$

The dissolving of the bismuth sulfate in brine may be regarded as simply a process of solution, but it is preferably regarded as a double decomposition according to the following reaction:

$$Bi_2(SO_4)_3 + 6NaCl = 2BiCl_3 + 3Na_2SO_4.$$

Sulfuric acid alone does not readily and completely dissolve bismuth compounds from the ore, for the reason that bismuth sulfate in a dilute sulfuric acid solution hydrolyzes with precipitation of basic bismuth sulfate. Bismuth oxid and carbonate, which exist in the ore, are not soluble in the brine alone. Bismuth sulfate is, however, readily soluble in salt brine, and consequently, enough sulfuric acid is added to the brine to convert the oxid and carbonate of bismuth to the sulfate, which is dissolved in the brine. The brine should contain 15% to 20% by weight of sodium chlorid, and care should be taken to prevent excessive dilution of the brine, for brine too highly diluted will cause hydrolysis to occur, in which case bismuth oxychlorid will be precipitated.

The precipitation of cement bismuth by means of metallic iron is represented by the following formula:

$$Bi_2(SO_4)_3 + 2Fe = 2Bi + Fe_2(SO_4)_3.$$

Actually, because of the large excess of iron used over the theoretical ratio, a ferrous salt is formed, as follows:

$$Fe_2(SO_4)_3 + Fe = 3FeSO_4.$$

The cement bismuth precipitated in this manner does not adhere tightly to the iron and is readily loosened by agitation of the solution or movement of the iron. The precipitated bismuth cement oxidizes when exposed to the air with formation of the oxid and carbonate. Such oxidation by air exposure is not detrimental, however, because of the fact that these oxygen compounds are easily reduced to the metal by means of carbon when the precipitate is melted.

Some cement bismuth may be precipitated in the leach pulp during the leaching process by iron particles derived from the crushing machinery. Any bismuth cement precipitated in this manner may be oxidized by the addition of manganese dioxid, as follows:

$$2Bi + 6H_2SO_4 + 3MnO_2 = Bi_2(SO_4)_3 + 3MnSO_4 + 6H_2O.$$

The solution of the metallic iron particles may also be brought about by the addition of manganese dioxid, according to the following reaction:

$$2Fe + 6H_2SO_4 + 3MnO_2 = Fe_2(SO_4)_3 + 3MnSO_4 + 6H_2O.$$

After the precipitation of bismuth on scrap iron, the barren brine which remains may be purified of the iron and manganese sulfates that enter into it as a result of the above reactions, by the addition of lime to the brine. On treatment with lime these impurities are precipitated as iron and manganese hydrates with formation of calcium sulfate, according to the following reactions:

$$FeSO_4 + Ca(OH)_2 + 2H_2O = Fe(OH)_2 + CaSO_4.2H_2O.$$
$$Fe_2(SO_4)_3 + 3Ca(OH)_2 + 6H_2O = 2Fe(OH)_3 + 3CaSO_4.2H_2O$$
$$MnSO_4 + Ca(OH)_2 + 2H_2O = Mn(OH)_2 + CaSO_4.2H_2O.$$

In case the bismuth is precipitated as bismuth hydrate or basic bismuth chlorid by the addition of lime to the pregnant solution, the lime is preferably added in the form of a milk made by slaking freshly burned lime with barren brine. The addition of this milk of lime is preferably done in the Pachuca tank, in which the materials are leached, and the precipitate is removed from the brine by filtering. The precipitation of the hydrate and basic chlorid in this manner takes place according to the following reactions:

$$Bi_2(SO_4)_3 + 3Ca(OH)_2 = 2Bi(OH)_3 + 3CaSO_4.$$
$$2BiCl_3 + 3Ca(OH)_2 = 2Bi(OH)_3 + 3CaCl_2.$$
$$BiCl_3 + Ca(OH)_2 = BiOCl + CaCl_2 + H_2O.$$

When the modified process above described is employed to extract bismuth from materials containing the bismuth in any form, the bismuth volatilizes as bismuth chlorid, on roasting the materials with common salt, and such volatilization is the result of several reactions of which the following are examples:

$$Bi_2S_3 + 6NaCl + 3O = 2BiCl_3 + 3Na_2SO_4.$$
$$3SiO_2 + 6NaCl + 2Bi + Oxygen = 3Na_2SiO_3 + 2BiCl_3.$$
$$3SiO_2 + 6NaCl + Bi_2S_3 + Oxygen = 3Na_2SiO_3 + 2BiCl_3 + 3SO_2.$$
$$3SiO_2 + 6NaCl + Bi_2O_3 = 3Na_2SiO_3 + 2BiCl_3.$$

It will be clearly understood from these reactions that the reactions which take place differ according to the kind of bismuth ore that is roasted. Other similar reactions may occur between the salt and other constituents of the ore, but these are, however, not vital to the process of bismuth recovery.

The bismuth metal which is obtained when bismuth materials are treated in conformity with the process and modification of such process, as hereinbefore described may be of sufficient purity for market, or it may contain other metals in sufficient quantity to require refining.

To avoid corrosions by the solutions as well as premature precipitation of cement bismuth, the tanks and pipes which come into contact with the solutions used in leaching should be made of wood and rubber respectively, or of similarly chemically resistant materials.

The brine which is used for leaching has been described as made acid with sulfuric acid. It is to be understood, however, that the brine may be made acid with hydrochloric acid, and a calcium chlorid brine may be used instead of a brine made with common salt.

Sulfuric acid may be used in conjunction with a calcium chlorid brine at the sacrifice of some calcium chlorid which will react with acid to form calcium sulfate according to the following reaction:

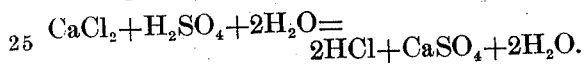
$$CaCl_2 + H_2SO_4 + 2H_2O = 2HCl + CaSO_4 + 2H_2O.$$

Although, when the bismuth is precipitated from the lime solution by addition of lime the formation of calcium chlorid in the precipitation reaction compensates for the above loss. However, the use of a common salt brine with sulfuric acid is preferable to the use of a calcium chlorid brine with either sulfuric or hydrochloric acid because common salt and sulfuric acid are commonly the cheaper materials.

Having set forth the nature and scope of the present invention, and the preferred form of the invention having been specifically described, what is claimed as new is:

1. The method of extracting bismuth from ores or materials, which consists in leaching the ores or materials with brine containing an acid to form a solution of the bismuth salt of said acid preparatory to precipitating the bismuth from solution.

2. The method of extracting bismuth from ores or materials, which consists in leaching the ores or materials with brine containing substantially 15 per cent. or more by weight of sodium chlorid and a quantity of sulfuric acid slightly in excess of that necessary to neutralize the basic constituents of the ores or materials whereby an acid brine solution of bismuth sulfate is formed.

3. The method of extracting bismuth from ores or materials containing the bismuth in an oxidized form, which consists in leaching the ores or materials with brine containing substantially 15 per cent. or more by weight of sodium chlorid and a quantity of sulfuric acid slightly in excess of that necessary to neutralize the basic constituents of the ores or materials.

4. The method of extracting bismuth from ores or materials, which consists in roasting the ores or materials to convert the materials contained therein to the oxidized state, leaching the roasted materials with brine containing sulfuric acid to form a solution of bismuth sulfate, preparatory to precipitating the bismuth from solution.

5. That step in a method of extracting bismuth from ores or materials which consists in leaching the ores or materials with brine containing sulfuric acid to form a solution of bismuth sulfate.

6. The cyclic method of extracting bismuth from ores and materials which consists in leaching the ores and materials with brine containing sulfuric acid to form a solution of bismuth sulfate, precipitating the bismuth from solution, and utilizing the barren brine for leaching fresh ores.

JOSEPH F. CULLEN.
MARVIN J. UDY.